United States Patent
Zhu et al.

(10) Patent No.: US 10,645,268 B2
(45) Date of Patent: May 5, 2020

(54) IMAGE PROCESSING METHOD AND APPARATUS OF TERMINAL, AND TERMINAL

(71) Applicant: Huawei Technologies Co., Ltd., Shenzhen (CN)

(72) Inventors: Congchao Zhu, Beijing (CN); Wei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/083,428

(22) PCT Filed: Mar. 9, 2016

(86) PCT No.: PCT/CN2016/076017
§ 371 (c)(1),
(2) Date: Sep. 7, 2018

(87) PCT Pub. No.: WO2017/152402
PCT Pub. Date: Sep. 14, 2017

(65) Prior Publication Data
US 2019/0098188 A1 Mar. 28, 2019

(51) Int. Cl.
*H04N 5/225* (2006.01)
*H04N 5/232* (2006.01)
(Continued)

(52) U.S. Cl.
CPC .......... *H04N 5/2258* (2013.01); *H04N 5/232* (2013.01); *H04N 5/2354* (2013.01);
(Continued)

(58) Field of Classification Search
CPC .... H04N 5/2258; H04N 5/357; H04N 5/2354; H04N 5/23245; H04N 5/232123; H04N 5/232
See application file for complete search history.

(56) References Cited

U.S. PATENT DOCUMENTS 6,788,338 B1   9/2004 Dinev et al.
2013/0016251 A1*  1/2013 Ogasahara ........... H04N 5/2258
                                                  348/238
(Continued)

FOREIGN PATENT DOCUMENTS

CN   101493893 A   7/2009
CN   101527033 A   9/2009
(Continued)

OTHER PUBLICATIONS

Xin, Li et al., "A new approach to fusing PAN and MS remote sensing images with high fidelity of color," Proc. of SPIE vol. 7494, Oct. 2009, 8 pages.
(Continued)

*Primary Examiner* — Nhan T Tran
(74) *Attorney, Agent, or Firm* — Slater Matsil, LLP

(57) ABSTRACT

In an image processing method and apparatus of a terminal, the terminal includes a monochrome camera and a color camera. The monochrome camera and the color camera are disposed side by side. The method includes receiving a photographing instruction, and controlling, according to the photographing instruction, the monochrome camera and the color camera to simultaneously photograph a current scene, to obtain a monochrome image and a color image of the current scene. The method also includes obtaining a luminance component and a chrominance component of the color image. The method further includes fusing the luminance component with the monochrome image to obtain a luminance-fused component, and obtaining a target color image according to the luminance-fused component and the chrominance component. The monochrome image is fused with the color image.

20 Claims, 6 Drawing Sheets

(51) Int. Cl.
H04N 5/235 (2006.01)
H04N 5/357 (2011.01)
(52) U.S. Cl.
CPC ... H04N 5/23245 (2013.01); H04N 5/232123 (2018.08); H04N 5/357 (2013.01)

(56) References Cited

U.S. PATENT DOCUMENTS

| | | | |
|---|---|---|---|
| 2013/0229544 A1* | 9/2013 | Bando | H04N 9/093 348/222.1 |
| 2014/0320602 A1* | 10/2014 | Govindarao | H04N 9/045 348/46 |
| 2015/0278996 A1* | 10/2015 | Tsutsumi | G06T 3/4038 348/47 |
| 2016/0050354 A1* | 2/2016 | Musatenko | H04N 5/2355 348/229.1 |
| 2018/0285660 A1* | 10/2018 | Ohara | G06T 7/85 |

FOREIGN PATENT DOCUMENTS

| | | |
|---|---|---|
| CN | 103595982 A | 2/2014 |
| CN | 103986875 A | 8/2014 |
| CN | 104363375 A | 2/2015 |
| CN | 105049718 A | 11/2015 |

OTHER PUBLICATIONS

Bennett, Eric P., et al., "Multispectral Bilateral Video Fusion," IEEE Transactions on Image Processing vol. 16, No. 5, May 2007, 10 pages.

* cited by examiner

IMAGE PROCESSING METHOD AND APPARATUS OF TERMINAL, AND TERMINAL

CROSS-REFERENCE TO RELATED APPLICATIONS

This application claims the benefit of, and is a national stage of International Application No. PCT/C2016/076017, filed on Mar. 9, 2016, which is hereby incorporated herein by reference in its entirety.

TECHNICAL FIELD

The present invention relates to image processing technologies, and in particular, to an image processing method and apparatus of a terminal and a terminal.

BACKGROUND

A charge coupled device (CCD) is usually installed in a camera of a camera device, so that the camera device can photograph a color image. The CCD is a special semiconductor device and is used to output luminance of light of different colors to an image processor in an electrical signal manner, so that the image processor finally generates a color image.

FIG. 1 is a schematic diagram of a working principle of a CCD in the prior art. A color filter array (CFA) is disposed in the CCD, and a photosensitive element array is disposed under the color filter array. The color filter array includes filters that are for three colors (red, green, and blue) and that are arranged in a preset sequence. White natural light includes light of seven colors: red, orange, yellow, green, blue, indigo, and purple. The color filter array is used to enable only the red light, the green light, and the blue light in the natural light to pass through the filters and reach the photosensitive element array. The photosensitive element array records an intensity of received light. As shown in FIG. 1, each color filter is corresponding to one photosensitive element. Each photosensitive element is corresponding to one pixel in an image, and a position of each pixel in the image is the same as a position of a corresponding photosensitive element in the photosensitive element array. A green filter in the color filter array is used as an example. Because only green light can pass through the green filter, only green light in an input natural light signal (FIG. 1 shows only the red light, the green light, and the blue light) can reach a photosensitive element. Finally, a real color of a pixel cannot be obtained. In this case, the image processor usually uses a demosaicing (demosaic) algorithm to synthesize the real color of the pixel. Specifically, for a primary color lacked by any pixel, an average value of digital signals of neighboring pixels that have the primary color is used as a digital signal of the primary color of the pixel, to finally obtain the real color of the pixel.

However, each color filter in the color filter array enables light of only one color to pass through and light of another color cannot pass through. Consequently, only some light is input to a photosensitive element, and image noise is relatively high. In addition, a light sampling rate is further reduced, and therefore an image resolution is reduced, that is, light information included in all pixels of an image is reduced. As shown in FIG. 1, only half of photosensitive elements in the photosensitive element array can receive the green light, and finally image quality is affected.

SUMMARY

Embodiments of the present invention provide an image processing method and apparatus of a terminal and a terminal to resolve a technical problem that a color image photographed by an existing single CCD camera device has a low resolution and high noise and therefore image quality is poor.

According to a first aspect, an embodiment of the present invention provides an image processing method of a terminal, where the terminal includes a monochrome camera and a color camera, and the monochrome camera and the color camera are disposed side by side. The method includes receiving a photographing instruction, and controlling, according to the photographing instruction, the monochrome camera and the color camera to simultaneously photograph a current scene, to obtain a monochrome image and a color image of the current scene. The method also includes obtaining a luminance component and a chrominance component of the color image, and fusing the luminance component with the monochrome image to obtain a luminance-fused component. The method further includes obtaining a target color image according to the luminance-fused component and the chrominance component.

In the foregoing method, advantages of a high resolution and low noise of the monochrome image are exploited to fuse the monochrome image with the color image, so that the target color image finally obtained after the fusion has the advantages of a high resolution and low noise. Compared with the color image photographed by the color camera, image quality is improved.

With reference to the first aspect, in a first possible implementation of the first aspect, a fusion process specifically includes: dividing the luminance component into at least two luminance blocks, and performing registration on the luminance component and the monochrome image to obtain a registration result, where the registration result includes a monochrome image block to be fused with each luminance block; and fusing, according to the registration result, the luminance component with the monochrome image to obtain the luminance-fused component.

With reference to the first possible implementation of the first aspect, in a second possible implementation of the first aspect, a registration process specifically includes: determining, for the luminance component according to a distance between the monochrome camera and the color camera, a focal length of the monochrome camera, and a focal length of the color camera, a search area in which registration processing is performed and that is in the monochrome image; and performing registration on the luminance component and the monochrome image in the search area to obtain the registration result.

In the foregoing method, a speed and accuracy of registration are increased by reducing a search area in the registration process, thereby further improving quality of subsequent image.

With reference to the first aspect, in a third possible implementation of the first aspect, the fusing the luminance component with the monochrome image to obtain a luminance-fused component includes: obtaining first high-frequency information and first low-frequency information of the luminance component, and obtaining second high-frequency information of the monochrome image; fusing the first high-frequency information with the second high-frequency information to obtain high-frequency fusion information; and performing pixel addition processing on the first low-frequency information and the high-frequency fusion information to obtain the luminance-fused component.

The high-frequency information mainly records information about an image edge and image details, and a high-frequency information component of the luminance component and a high-frequency information component of the monochrome image are selected for fusion, and this improves a fusion effect of the monochrome image and the luminance component.

With reference to the third possible implementation of the first aspect, in a fourth possible implementation of the first aspect, before the performing pixel addition processing on a first low-frequency information image and a high-frequency fusion image to obtain a luminance-fused image, the method further includes: performing enhancement processing on the high-frequency fusion information to obtain high-frequency fusion information obtained after the enhancement processing.

With the foregoing enhancement processing, information included in the high-frequency fusion information is clearer in the luminance-fused component.

With reference to any one of the first aspect or the first to the fourth feasible implementations of the first aspect, in a fifth feasible implementation of the first aspect, before splitting the color image into the luminance component and the chrominance component, the method further includes: performing luminance correction processing on the color image according to the monochrome image, to obtain a luminance-corrected color image.

With reference to any one of the first aspect or the first to the fifth feasible implementations of the first aspect, in a sixth feasible implementation of the first aspect, before the obtaining a target color image according to the luminance-fused component and the chrominance component, the method further includes: performing noise reduction processing on the chrominance component to obtain a chrominance component obtained after the noise reduction processing.

After luminance consistency correction and the noise reduction processing, quality of the target color image can further be improved.

The following introduces an image processing apparatus of a terminal provided in an embodiment of the present invention. The apparatus is one-to-one corresponding to the method and is configured to implement the image processing method in the foregoing embodiment. The apparatus has same technical features and technical effects with the method, and details are not described in the present invention again.

According to a second aspect, an embodiment of the present invention provides an image processing apparatus of a terminal, where the terminal includes a monochrome camera and a color camera, and the monochrome camera and the color camera are disposed side by side. The apparatus includes an input image obtaining module, configured to receive a photographing instruction, and control, according to the photographing instruction, the monochrome camera and the color camera to simultaneously photograph a current scene, to obtain a monochrome image and a color image of the current scene. The apparatus also includes a component obtaining module, configured to obtain a luminance component and a chrominance component of the color image. The apparatus also includes a fusion module, configured to fuse the luminance component with the monochrome image to obtain a luminance-fused component. The apparatus further includes a target color image obtaining module, configured to obtain a target color image according to the luminance-fused component and the chrominance component.

With reference to the second aspect, in a first possible implementation of the second aspect, the fusion module is specifically configured to: divide the luminance component into at least two luminance blocks, and perform registration on the luminance component and the monochrome image to obtain a registration result, where the registration result includes a monochrome image block to be fused with each luminance block; and fuse, according to the registration result, the luminance component with the monochrome image to obtain the luminance-fused component.

With reference to the first possible implementation of the second aspect, in a second possible implementation of the second aspect, the fusion module is specifically configured to: determine, for the luminance component according to a distance between the monochrome camera and the color camera, a focal length of the monochrome camera, and a focal length of the color camera, a search area in which registration processing is performed and that is in the monochrome image; and perform registration on the luminance component and the monochrome image in the search area to obtain the registration result.

With reference to the second aspect, in a third possible implementation of the second aspect, the fusion module includes: a high-frequency information obtaining unit, configured to: obtain first high-frequency information and first low-frequency information of the luminance component, and obtain second high-frequency information of the monochrome image; a high-frequency fusion information obtaining unit, configured to fuse, according to the registration result, the first high-frequency information with the second high-frequency information to obtain high-frequency fusion information; and a luminance-fused component obtaining unit, configured to perform pixel addition processing on the first low-frequency information and the high-frequency fusion information to obtain the luminance-fused component.

With reference to the third possible implementation of the second aspect, in a fourth possible implementation of the second aspect, the fusion module further includes: an enhancement unit, configured to perform enhancement processing on the high-frequency fusion information to obtain high-frequency fusion information obtained after the enhancement processing.

With reference to any one of the second aspect or the first to the fourth feasible implementations of the second aspect, in a fifth feasible implementation of the second aspect, the image processing apparatus of the terminal further includes: a luminance correction module, configured to perform luminance correction processing on the color image according to the monochrome image, to obtain a luminance-corrected color image.

With reference to any one of the second aspect or the first to the fifth feasible implementations of the second aspect, in a sixth feasible implementation of the second aspect, the image processing apparatus of the terminal further includes: a noise reduction module, configured to perform noise reduction processing on the chrominance component to obtain a chrominance component obtained after the noise reduction processing.

The following introduces a terminal provided in an embodiment of the present invention. The terminal is one-to-one corresponding to the method and is configured to implement the image processing method in the foregoing embodiment. The terminal has same technical features and technical effects with the method, and details are not described in the present invention again.

According to a third aspect, an embodiment of the present invention provides a terminal, where the terminal includes a monochrome camera, a color camera, and an image processor, and the monochrome camera and the color camera are disposed side by side. The image processor is configured to: receive a photographing instruction, and control, according to the photographing instruction, the monochrome camera and the color camera to simultaneously photograph a current scene, to obtain a monochrome image and a color image of the current scene; obtain a luminance component and a chrominance component of the color image; fuse the luminance component with the monochrome image to obtain a luminance-fused component; and obtain a target color image according to the luminance-fused component and the chrominance component.

With reference to the third aspect, in a first possible implementation of the third aspect, the image processor is specifically configured to: divide the luminance component into at least two luminance blocks, and perform registration on the luminance component and the monochrome image to obtain a registration result, where the registration result includes a monochrome image block to be fused with each luminance block; and fuse, according to the registration result, the luminance component with the monochrome image to obtain the luminance-fused component.

With reference to the first possible implementation of the third aspect, in a second possible implementation of the third aspect, the image processor is specifically configured to: determine, for the luminance component according to a distance between the monochrome camera and the color camera, a focal length of the monochrome camera, and a focal length of the color camera, a search area in which registration processing is performed and that is in the monochrome image; and perform registration on the luminance component and the monochrome image in the search area to obtain the registration result.

With reference to the third aspect, in a third possible implementation of the third aspect, the image processor is specifically configured to: obtain first high-frequency information and first low-frequency information of the luminance component, and obtain second high-frequency information of the monochrome image; fuse, according to the registration result, the first high-frequency information with the second high-frequency information to obtain high-frequency fusion information; and perform pixel addition processing on the first low-frequency information and the high-frequency fusion information to obtain the luminance-fused component.

With reference to the third possible implementation of the third aspect, in a fourth possible implementation of the third aspect, the image processor is further configured to: perform enhancement processing on the high-frequency fusion information to obtain high-frequency fusion information obtained after the enhancement processing; and perform pixel addition processing on the first low-frequency information and the high-frequency fusion information obtained after the enhancement processing, to obtain the luminance-fused component.

With reference to any one of the third aspect or the first to the fourth feasible implementations of the third aspect, in a fifth feasible implementation of the third aspect, the image processor is further configured to: perform luminance correction processing on the color image according to the monochrome image, to obtain a luminance-corrected color image; and obtain a luminance component and a chrominance component of the luminance-corrected color image.

With reference to any one of the third aspect or the first to the fifth feasible implementations of the third aspect, in a sixth feasible implementation of the third aspect, the image processor is further configured to: perform noise reduction processing on the chrominance component to obtain a chrominance component obtained after the noise reduction processing; and obtain the target color image according to the luminance-fused component and the chrominance component obtained after the noise reduction processing.

The following introduces a storage medium provided in an embodiment of the present invention, the storage medium is configured to implement the image processing method according to any one of the foregoing first aspect or the first to the sixth feasible implementations of the first aspect. The storage medium has same technical features and technical effects with the method, and details are not described in the present invention again.

According to a fourth aspect, an embodiment of the present invention provides a storage medium, where the storage medium is a computer readable storage medium and stores one or more programs, the one or more programs include an instruction, and when being executed by a portable electronic device including a camera and multiple applications, the instruction enables the portable electronic device to execute the image processing method according to any one of the foregoing first aspect or the first to the sixth feasible implementations of the first aspect, where the camera includes a monochrome camera and a color camera.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
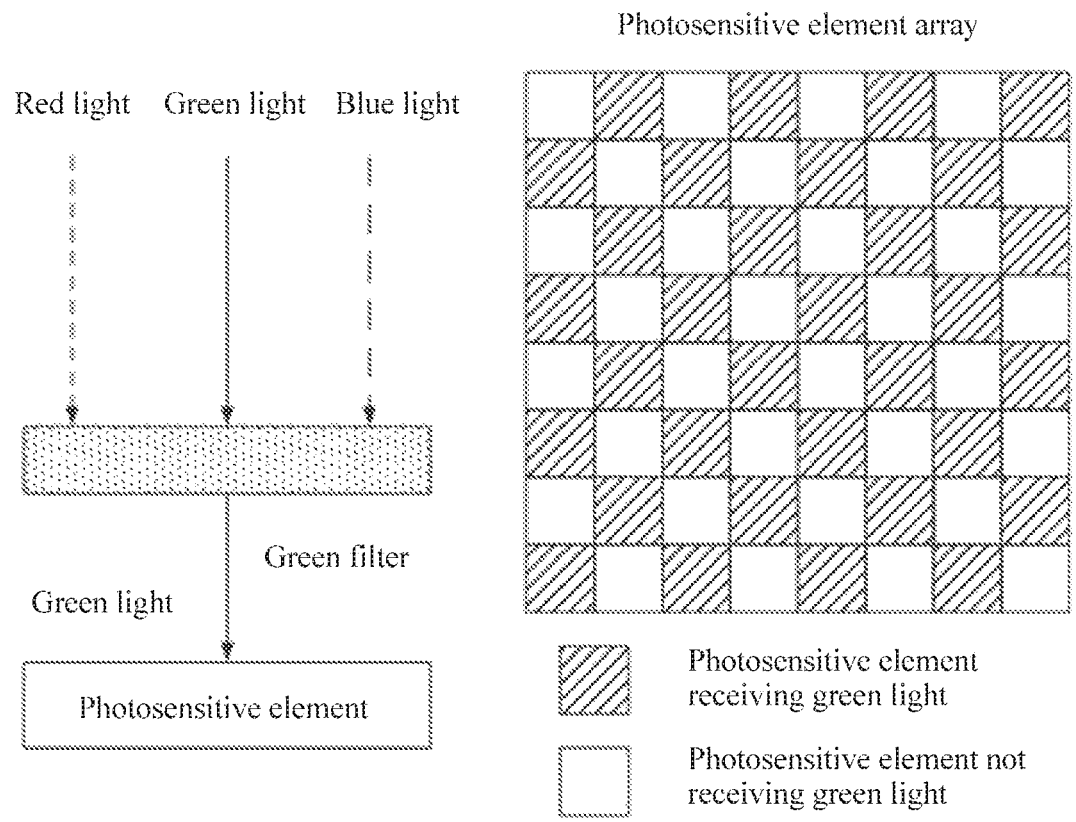
FIG. 1 is a schematic structural diagram of an embodiment of a color filter array in the prior art.
Figure 2:
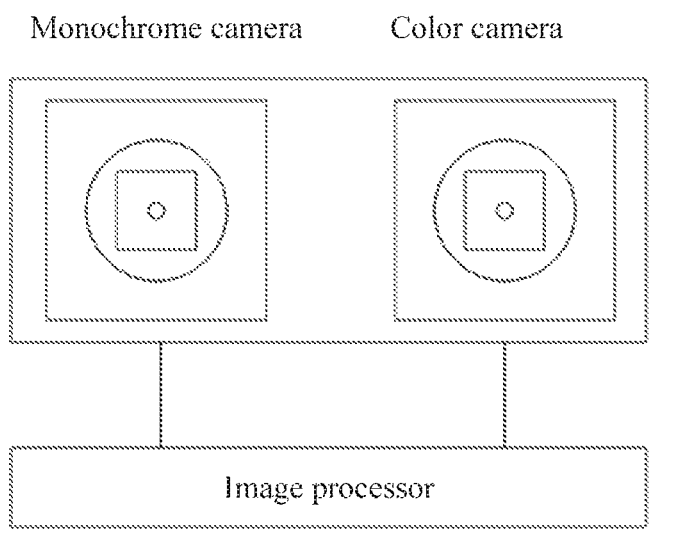
FIG. 2 is a schematic structural diagram of a terminal according to the present invention.

For a technical problem that a color image photographed by an existing single CCD camera device has a low resolution and high noise and therefore image quality is poor, an embodiment of the present invention provides an image processing method of a terminal. The terminal includes a monochrome camera and a color camera, and the monochrome camera and the color camera are disposed side by side and simultaneously photograph a current scene. The terminal may be a camera device, or may be a mobile phone, a tablet computer, or the like. For a specific implementation of the terminal, the camera device is used as an example instead of a specific limitation in the following description of this embodiment. FIG. 2 is a schematic structural diagram of an embodiment of a terminal according to the present invention. Specifically, as shown in FIG. 2, two cameras are independent of each other, have parallel optical axes, and synchronously capture an image, so that the camera device can obtain a monochrome image and a color image by photographing a same scene. According to the image processing method provided in this embodiment, the monochrome image having advantages of a high light sampling rate and low noise is fused with the color image that has a relatively low resolution and relatively high noise and that is of the same scene as the color image, so as to reduce the noise and increase the resolution of the color image. During actual use, the two cameras of the terminal may be set to work at the same time, and the image processing method provided in the present invention may be applied to obtain a fused target color image. Alternatively, a single camera may be set to work alone, and a color image or a monochrome image obtained by the single camera by photographing the current scene is directly stored or output. The following uses a specific embodiment to describe the image processing method in the present invention in detail.

Figure 3:
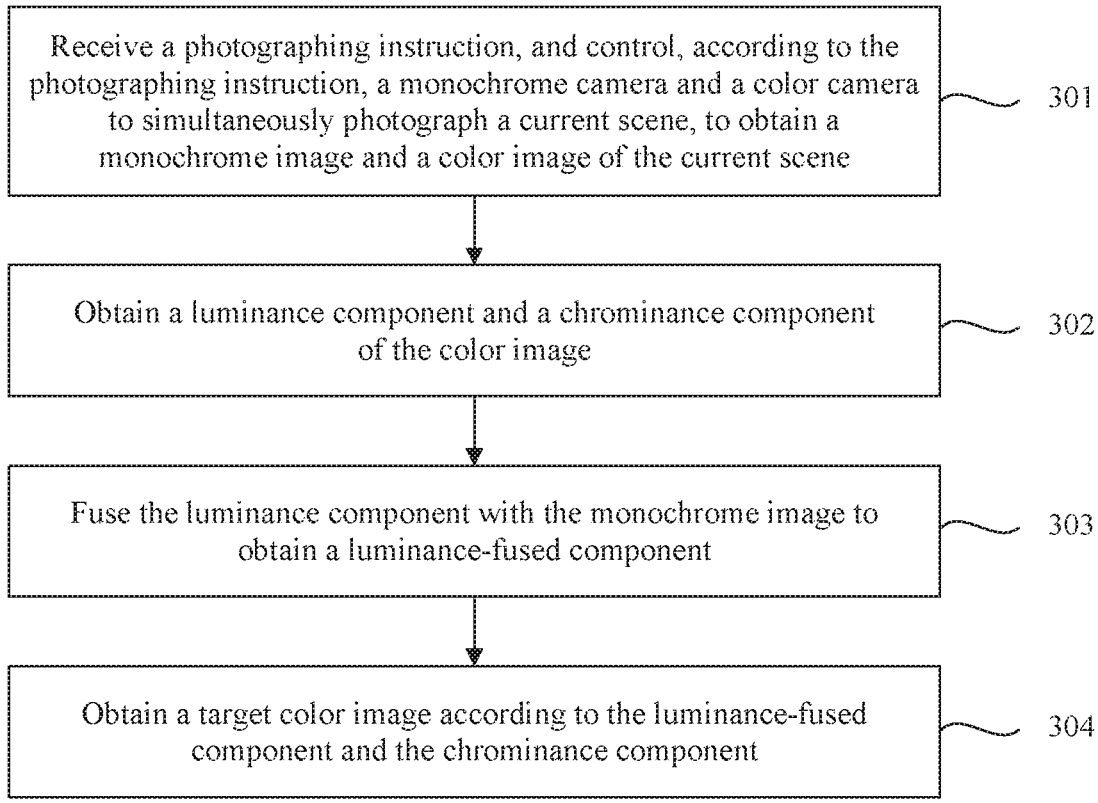
FIG. 3 is a schematic flowchart of Embodiment 1 of an image processing method of a terminal according to the present invention.

FIG. 3 is a schematic flowchart of Embodiment 1 of an image processing method of a terminal according to the present invention. The method is executed by an image processing apparatus, and the apparatus may be implemented by any software and/or hardware. For example, the apparatus may be an image processor in FIG. 2, and the image processor is disposed in a camera device. As shown in FIG. 3, the method includes the following.

Step 301: Receive a photographing instruction, and control, according to the photographing instruction, a monochrome camera and a color camera to simultaneously photograph a current scene, to obtain a monochrome image and a color image of the current scene.

Step 302: Obtain a luminance component and a chrominance component of the color image.

Step 303: Fuse the luminance component with the monochrome image to obtain a luminance-fused component.

Step 304: Obtain a target color image according to the luminance-fused component and the chrominance component.

In this embodiment of the present invention, both an image and a component in an image processing process are in a matrix format, and are stored in the matrix format. When the image processing process ends, the image is displayed according to different image format standards.

Specifically, in step 301, after receiving the photographing instruction, the image processing apparatus controls, according to the photographing instruction, the monochrome camera and the color camera to simultaneously photograph the current scene. Then, the monochrome image and the color image of the current scene can be obtained. The photographing instruction may be triggered by a user by pressing a photographing button on the camera device. Because the monochrome camera includes only a photosensitive element and does not include any color filter or color filter array, and can receive all natural light signals, the photosensitive element can record an intensity of all light and has a relatively high light transmission rate. Therefore, compared with the color image that is obtained in a same photographing environment as the monochrome image, the monochrome image has advantages of a high light sampling rate and low noise. In addition, because each photosensitive element records only light intensity information without color information, the monochrome image is an intensity image. For example, when a monochrome image M includes 720×480 pixels, the monochrome image may be represented by a two-dimensional matrix M having a size of 720×480, where 720 indicates a total number of columns of the matrix M, and 480 indicates a total number of rows of the matrix M.

In this embodiment, the color image that is output by the color camera is in a red-green-blue color space, and is represented by three colors: red, green, and blue. For example, when a color image includes 720×480 pixels, the color image is represented by a three-dimensional matrix C having a size of 720×480×3, where 720 indicates a total number of columns of the matrix C, 480 indicates a total number of rows of the matrix C, and 3 is a total number of pages of the matrix C. All the pages separately represent one two-dimensional matrix that is of one color and that has a size of 720×480, and are respectively recorded as R, G, and B. The two-dimensional matrix R represents an intensity value of red light of the color image, the two-dimensional matrix G represents an intensity value of green light of the color image, and the two-dimensional matrix B represents an intensity value of blue light of the color image. A final color presented by each pixel of the color image is jointly determined by the intensity value of the red light, the intensity value of the green light, and the intensity value of the blue light of the pixel.

To obtain the target color image, the monochrome image needs to be fused with the luminance component of the color image. Therefore, the luminance component of the color image needs to be obtained first. Specifically, the color image in the red-green-blue color space may be converted, according to a color space conversion formula of the color image, into a color image that is represented by the luminance component and the chrominance component and that is in a luminance-chrominance color space.

The color space conversion formula is:

$Y(i,j)=0.299 \times R(i,j)+0.587 \times G(i,j)+0.114 \times B(i,j);$ $U(i,j)=0.1687 \times R(i,j)-0.3313 \times G(i,j)+0.5 \times B(i,j)+128;$ and $V(i,j)=0.5 \times R(i,j)-0.4187 \times G(i,j)-0.0813 \times B(i,j)+128.$ i represents a number of columns of pixels in a matrix, j represents a number of rows of pixels in a matrix, a value range of i is [0, 720], and a value range of j is [0, 360].

The converted color image is also a three-dimensional matrix having a size of 720×360×3, and includes three two-dimensional matrices having a size of 720×360: Y, U, and V. The two-dimensional matrix Y stores luminance values of pixels of the color image, and the two-dimensional matrix Y is the luminance component of the color image. The other two two-dimensional matrices U and V store chrominance values of pixels of the color image, and are jointly used as the chrominance component of the color image. In this case, the final color presented by each pixel of the color image is jointly determined by a luminance value and a chrominance value of the pixel.

A person skilled in the art may understand that the foregoing color space conversion formula illustrates only an example of a luminance component obtaining method, and another feasible manner is not limited in this embodiment.

In step 303, in a specific process of fusing the luminance component and the monochrome image, a luminance value of a pixel in the two-dimensional matrix Y representing the luminance component and a luminance value of a pixel that has a same position in the two-dimensional matrix M representing the monochrome image are averaged, and an obtained average value is used as a fusion value. A luminance fusion matrix L1 having a size of 720×360, that is, the luminance-fused component, is obtained according to each fusion value.

The obtaining a target color image according to the luminance-fused component and the chrominance component in step 304 may be specifically: separately using three two-dimensional matrices: the two-dimensional matrix U and the two-dimensional matrix V that represent the chrominance component and the luminance fusion matrix L1 as three pages of a new three-dimensional matrix C2 having a size of 720×480×3. The obtained three-dimensional matrix C2 is the target color image. The camera device finally stores or outputs the target color image.

According to the image processing method provided in this embodiment of the present invention, the luminance component and the chrominance component of the color image are obtained, the monochrome image is fused with the luminance component to obtain the luminance-fused component, and finally the target color image is obtained according to the chrominance component and the luminance-fused component. The advantages of a high resolution and low noise of the monochrome image are exploited to fuse the monochrome image with the color image, so that the target color image finally obtained after the fusion has the advantages of a high resolution and low noise. Compared with the color image photographed by the color camera, image quality is improved.

Figure 4:
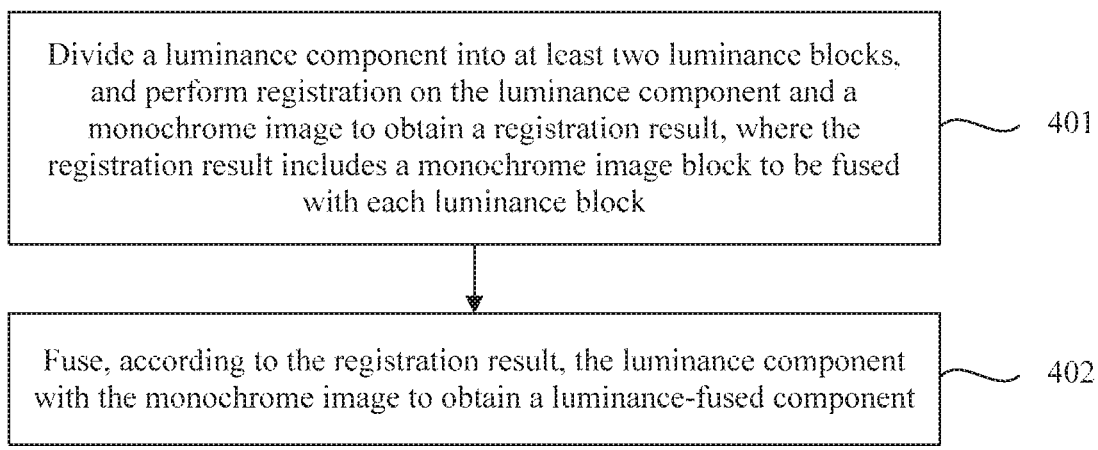
FIG. 4 is a schematic flowchart of Embodiment 2 of an image processing method of a terminal according to the present invention.

With reference to FIG. 4, the following describes a process of fusing the luminance component with the monochrome image to obtain the luminance-fused component in detail. FIG. 4 is a schematic flowchart of Embodiment 2 of the image processing method of the terminal according to the present invention. As shown in FIG. 4, the method includes the following.

Step 401: Divide the luminance component into at least two luminance blocks, and perform registration on the luminance component and the monochrome image to obtain a registration result, where the registration result includes a monochrome image block to be fused with each luminance block.

Step 402: Fuse, according to the registration result, the luminance component with the monochrome image to obtain the luminance-fused component.

Specifically, in step 401, the luminance component is divided into at least two luminance blocks, and registration is performed on the luminance component and the monochrome image to obtain the registration result. Registration processing on the luminance component and the monochrome image may be specifically block matching processing. For each luminance block of the luminance component, a monochrome image block is determined from the monochrome image and is fused with the luminance block. Optionally, a second pixel that is in the monochrome image and that is to be fused with each first pixel in the luminance component may further be determined according to the registration result. Specifically, it is learned by means of block matching processing that, a luminance block E in the luminance component and a monochrome image block F in the monochrome image are blocks having a smallest pixel difference. For the first pixel and the second pixel that can be fused, a position of the first pixel in the luminance block E is the same as a position of the second pixel in the monochrome image block F. A position of a pixel is a row and a column in which the pixel is located in a pixel array of an image to which the pixel belongs. Optionally, the registration result further includes a first fusion weight of each first pixel in the luminance component and a second fusion weight of each second pixel in the monochrome image.

In step 402, a specific fusion process may be preferably as follows: For any first pixel X in the luminance component, the first pixel X is fused with a second pixel Y, which is fused with the first pixel X in the luminance component, in the monochrome image according to a luminance value X, and a first fusion weight a of the first pixel X and a luminance value Y, and a second fusion weight b of the second pixel Y, and the luminance-fused component is finally obtained.

For example, during fusion, a value range of the first fusion weight a and the second fusion weight b is usually [0,1], and a+b=1. A luminance value of any pixel Z in the luminance-fused component, that is, a fusion value, is obtained by fusing the first pixel X and the second pixel Y that have a same position with the pixel Z. For example, a fusion formula is: fusion value $=a*X_1+b*Y_1$.

Figure 5:
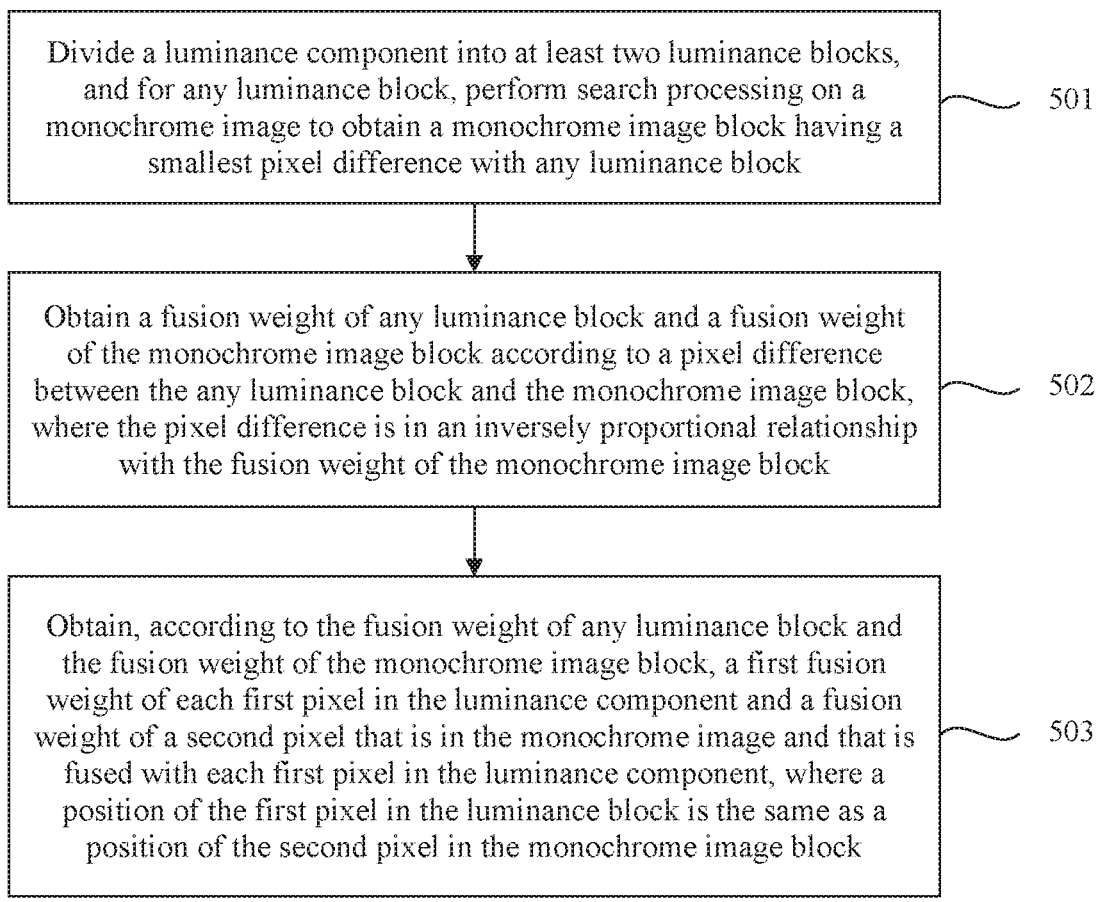
FIG. 5 is a schematic flowchart of Embodiment 3 of an image processing method of a terminal according to the present invention.

By using FIG. 5, the following describes a block matching processing process in the embodiment shown in FIG. 4 in detail. FIG. 5 is a schematic flowchart of Embodiment 3 of the image processing method of the terminal according to the present invention. The method includes following.

Step 501: Divide the luminance component into at least two luminance blocks, and for each luminance block, perform search processing on the monochrome image to obtain a monochrome image block having a smallest pixel difference with each luminance block.

Step 502: Obtain a fusion weight of each luminance block and a fusion weight of the monochrome image block according to a pixel difference between the luminance block and the monochrome image block, where the pixel difference is in an inversely proportional relationship with the fusion weight of the monochrome image block.

Step 503: Obtain, according to the fusion weight of each luminance block and the fusion weight of the monochrome image block, a first fusion weight of each first pixel in the luminance component and a fusion weight of a second pixel that is in the monochrome image and that is fused with each first pixel in the luminance component, where a position of the first pixel in the luminance block is the same as a position of the second pixel in the monochrome image block.

In step 501, the luminance component is divided into at least two luminance blocks, and the division may be performed evenly or unevenly. For example, any luminance block E obtained by means of the division includes m*n pixels, and m and n are positive integers. For the luminance block E, a search box is moved in the monochrome image to perform a search according to a preset sequence such as a sequence from left to right or from top to bottom. A size of the search box is m*n pixels, and multiple monochrome image blocks having a size of m*n may be obtained after the search. The luminance block E is compared with all the monochrome image blocks having the size of m*n, so as to obtain a pixel difference. The pixel difference may be specifically obtained by performing addition on m*n differences that are obtained by performing difference calculation between luminance values of pixels in corresponding positions that are respectively in the luminance block E and the monochrome image block. A monochrome image block F having a smallest pixel difference with the luminance block E is determined according to multiple obtained pixel differences. A person skilled in the art may understand that, a smaller pixel difference indicates more similarities between the luminance block E and the monochrome image block F. When the pixel difference is o, it indicates that the luminance block E is totally the same as the monochrome image block F.

Figure 6:
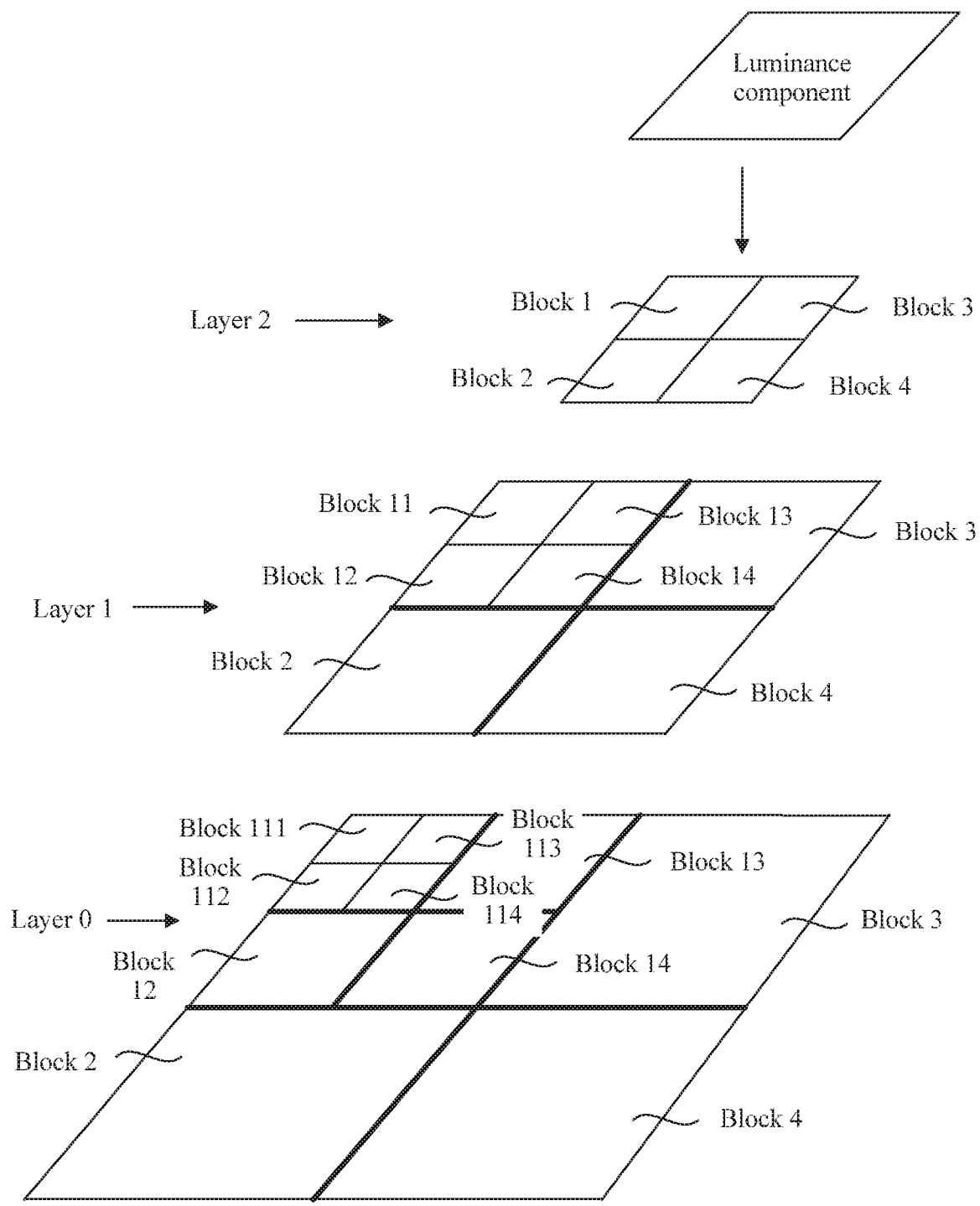
FIG. 6 is a schematic diagram of a principle of a pyramid-based block matching algorithm according to the present invention.

A person skilled in the art may understand that, to improve a speed of an image block matching process, a block matching algorithm in this embodiment may be specifically a pyramid-based block matching algorithm. FIG. 6 is a schematic diagram of a principle of a pyramid-based block matching algorithm according to the present invention. As shown in FIG. 6, for example, a pyramid includes three layers: a layer 0, a layer 1, and a layer 2. At the layer 2, a luminance component including P*Q pixels is divided into four luminance blocks: a block 1, a block 2, a block 3, and a block 4. At the layer 1, the four luminance blocks (the block 1, the block 2, the block 3, and the block 4) at the layer 2 are subdivided, for example, the block 1, the block 2, the block 3, and the block 4 each are divided into four luminance blocks, and the block 1 includes a block 11, a block 12, a block 13, and a block 14. At the layer o, multiple luminance blocks at the layer 1 are subdivided again, for example, the block 11 is divided into a block 111, a block 112, a block 113, and a block 114. Block matching is first performed on any luminance block at the layer 2, for example, the block 1, and a monochrome image block having a smallest pixel difference with the block 1 is determined from the monochrome image, for example, the monochrome image block is a block 01. Then, matching is performed on any luminance block that belongs to the block 1 and that is at the layer 1, for example, the block 11. In this case, a search needs to be performed only in the block 01 in the monochrome image, to determine a monochrome image block having a smallest pixel difference, a block on. Finally, matching is performed on any luminance block that belongs to the block 11 and that is at the layer o, for example, the block 111. In this case, a search needs to be performed only in the block on in the monochrome image, to determine a monochrome image block having a smallest pixel difference, a block 0111. The foregoing pyramid establishment method is merely an example of a division method, but not a limitation to the present invention. Obviously, the pyramid-based coarse-to-fine block matching algorithm significantly reduces a search area of the search box, accelerates a matching speed, and improves matching accuracy.

In step 502, the pixel difference is in an inversely proportional relationship with a fusion weight of the monochrome image block F. A smaller pixel difference indicates a larger fusion weight of the monochrome image block F and a smaller fusion weight of the luminance block E. Therefore, a fusion weight of any luminance block and the fusion weight of the monochrome image block can be obtained according to a pixel difference between the any luminance block and the monochrome image block. Optionally, the fusion weight of the monochrome image block F+the fusion weight of the luminance block E=1.

In step 503, a first fusion weight of any first pixel in the luminance block E is the fusion weight of the luminance block E, and a second fusion weight of any second pixel in the monochrome image block F is the fusion weight of the monochrome image block F. Optionally, for an edge pixel in an edge position of the luminance block E, a first fusion weight of the edge pixel may be obtained by averaging fusion weights of luminance blocks to which all adjacent pixels of the edge pixel respectively belong. A fusion weight processing method of an edge pixel in the monochrome image block F is similar, and details are not described herein again.

Optionally, in the embodiment shown in FIG. 4 or FIG. 5, to increase a registration speed, a search area in which registration processing is performed on the monochrome image may further be first determined. Specifically, the following feasible implementations may be used.

In one feasible implementation, a search area in which the registration processing is performed and that is in the monochrome image is determined for the luminance component according to a distance between the monochrome camera and the color camera, a focal length of the monochrome camera, and a focal length of the color camera; and registration is performed on the luminance component and the monochrome image in the search area to obtain the registration result. For example, an offset between positions of same content in the monochrome image and the color image may be determined according to the distance between the monochrome camera and the color camera, the focal length of the monochrome camera, and the focal length of the color camera. Further, a search area for block match searching is determined according to the offset, so as to reduce a search area in a block matching process and increase a block matching speed and accuracy. Optionally, the offset may be determined by querying an offset table. The offset table records a correspondence between an offset and a distance between the two cameras and a correspondence between an offset and a respective focal length.

In another feasible implementation, feature point matching is performed on the monochrome image and the color image to obtain a feature point position correspondence between the monochrome image and the color image; an offset between positions of same content in the monochrome image and the color image is determined according to the feature point position correspondence; and further, a search area for block match searching is determined according to the offset, so as to reduce a search area in a block matching process and increase a block matching speed and accuracy.

Figure 7:
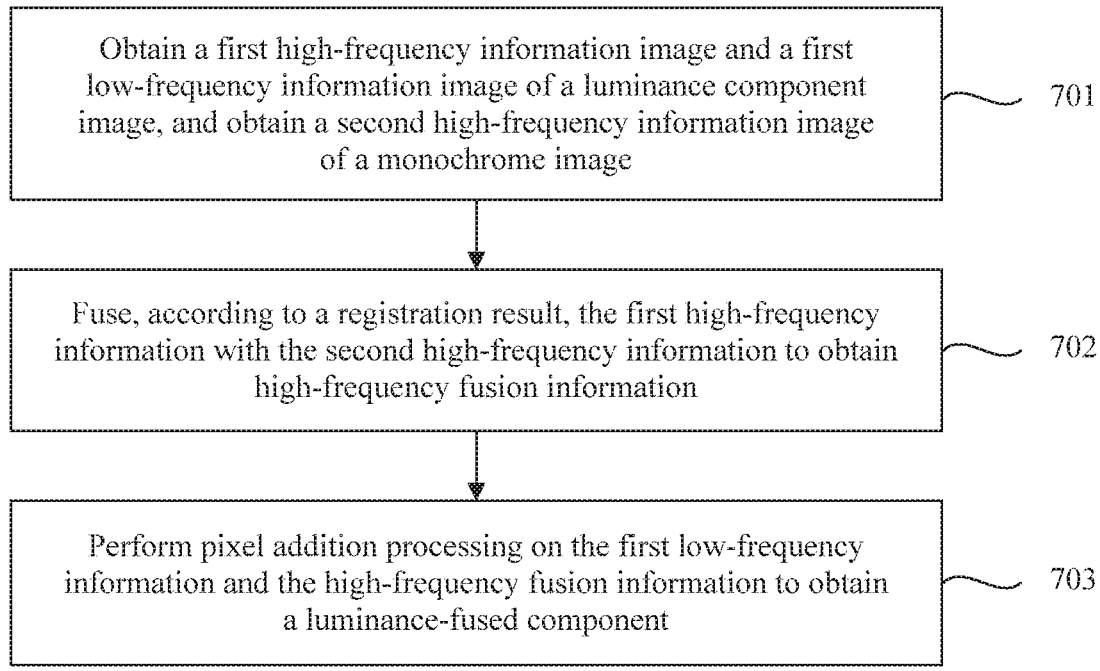
FIG. 7 is a schematic flowchart of Embodiment 4 of an image processing method of a terminal according to the present invention.

Further, on the basis of the embodiment shown in FIG. 4 or FIG. 5, to improve a fusion effect, high-frequency information of the luminance component and high-frequency information of the monochrome image are used for fusion. The following describes in detail a specific implementation by using FIG. 7. FIG. 7 is a schematic flowchart of Embodiment 4 of the image processing method of the terminal according to the present invention. The method includes the following.

Step 701: Obtain first high-frequency information and first low-frequency information of the luminance component, and obtain second high-frequency information of the monochrome image.

Step 702: Fuse, according to the registration result, the first high-frequency information with the second high-frequency information to obtain high-frequency fusion information.

Step 703: Perform pixel addition processing on the first low-frequency information and the high-frequency fusion information to obtain the luminance-fused component.

In this embodiment, low-pass filtering is performed on the luminance component, so that only low-frequency information in the luminance component can pass through a low-pass filter, to obtain the low-frequency information in the luminance component, that is, the first low-frequency information. After a low-frequency value of a pixel of the first low-frequency information obtained after the low-pass filtering is subtracted from a luminance value of a pixel of the luminance component obtained before the low-pass filtering, high-frequency information of the luminance component, that is, the first high-frequency information is obtained. The second high-frequency information is obtained by using a same processing method, and details are not described again.

In a fusion process of this embodiment, the first high-frequency information and the second high-frequency information are used for fusion, and the high-frequency fusion information is obtained. A specific fusion method may be the same as the fusion method in the embodiment shown in FIG. 4, and details are not described again.

Optionally, high-frequency enhancement processing may be performed on the high-frequency fusion information, so that information included in the high-frequency fusion information is clearer in the luminance-fused component. Specifically, in a high-frequency enhancement processing process, a high-frequency value of each pixel in the high-frequency fusion information may be multiplied by an enhancement coefficient, to increase the high-frequency value of each pixel. When the high-frequency fusion information is enhanced, an enhancement degree may be set according to light sensitivity of a current image photographed by the camera device. For example, when light sensitivity is relatively low, and noise is relatively low, relatively strong enhancement may be performed to increase a definition; when light sensitivity is relatively high, relatively weak enhancement may be performed to avoid obvious noise.

Finally, pixel addition processing is performed on the first low-frequency information of the luminance component and the high-frequency fusion information to obtain the luminance-fused component.

In this embodiment, low-pass filtering processing is performed on the luminance component and the monochrome image to obtain the high-frequency information and the low-frequency information. The high-frequency information of the monochrome image and the high-frequency information of the luminance component are fused to obtain the high-frequency fusion information, so that high-frequency component information in the luminance-fused component is fused with the high-frequency information of the monochrome image. Light transmission of the monochrome camera is different from that of the color camera, and therefore two images are different in luminance, that is, luminance of one image is higher than that of the other image on the whole, or luminance of partial content of one image is higher than that of the other image and at the same time, luminance of partial content of the one image is lower than that of the other image. In this case, if the monochrome image is directly fused with the luminance component, the obtained luminance-fused component may have an inconsistent luminance change. However, the high-frequency information mainly records information about an image edge and image details, and does not include the foregoing high-luminance and low-luminance information. In addition, human naked eyes are more sensitive to an image edge and image details. Therefore, in this embodiment, the high-frequency information of the luminance component and the high-frequency information of the monochrome image are selected for fusion. This keeps the advantages of low noise and a high resolution of the monochrome image, avoids the foregoing luminance change problem, and improves a fusion effect of the monochrome image and the luminance component.

Optionally, based on any of the foregoing embodiments, before the luminance component and the chrominance component of the color image are obtained, luminance correction processing may further be performed on the color image according to the monochrome image. Then, a luminance component and a chrominance component of a luminance-corrected color image are obtained, and the fusion method described in any of the foregoing embodiments is used to obtain the target color image.

A specific process of the foregoing luminance correction may be specifically: Average luminance of the monochrome image and that of the color image are compared to obtain a luminance correction coefficient of the color image, and the luminance component of the color image is multiplied by the correction coefficient to increase luminance, or each color component of the color image is separately multiplied by a preset correction coefficient corresponding to each color component, so that the color image and the monochrome image achieve luminance consistency, thereby improving accuracy of a subsequent registration processing process.

Optionally, based on any of the foregoing embodiments, before the target color image is obtained according to the luminance-fused component and the chrominance component, noise reduction processing may further be first performed on the chrominance component to obtain a chrominance component obtained after the noise reduction processing, and then the target color image is obtained according to the luminance-fused component and the chrominance component obtained after the noise reduction processing.

In a specific implementation process, a joint bilateral filtering algorithm or a guided filtering algorithm may be used to perform noise reduction processing on the chrominance component. There is little edge information in the chrominance component, and therefore a filtering coefficient is set for the joint bilateral filtering algorithm or the guided filtering algorithm with reference to edge information in the luminance-fused component. In this way, after filtering, the edge information in the chrominance component is reserved while noise of the chrominance component is removed, and image quality is improved.

Optionally, based on any of the foregoing embodiments, when illuminance is low, an image photographed by the camera device is greatly affected by an objective environment and each component of the camera device. As a result, a great amount of noise may be included in the image, and weaker light indicates more noise in the image. When a monochrome image and a color image of a current scene are obtained by using dual cameras, multiple pairs of monochrome images and color images may be first captured, to increase a definition of an image and reduce noise of the image. Temporal noise reduction processing is performed on the multiple monochrome images to obtain one frame monochrome image with relatively low noise. Temporal noise reduction processing is performed on the multiple color images to obtain one color image with relatively low noise. Finally, image processing is performed on the monochrome image with the relatively low noise and the color image with the relatively low noise according to the method provided in the present invention, to obtain a color image with relatively high quality.

Figure 8:
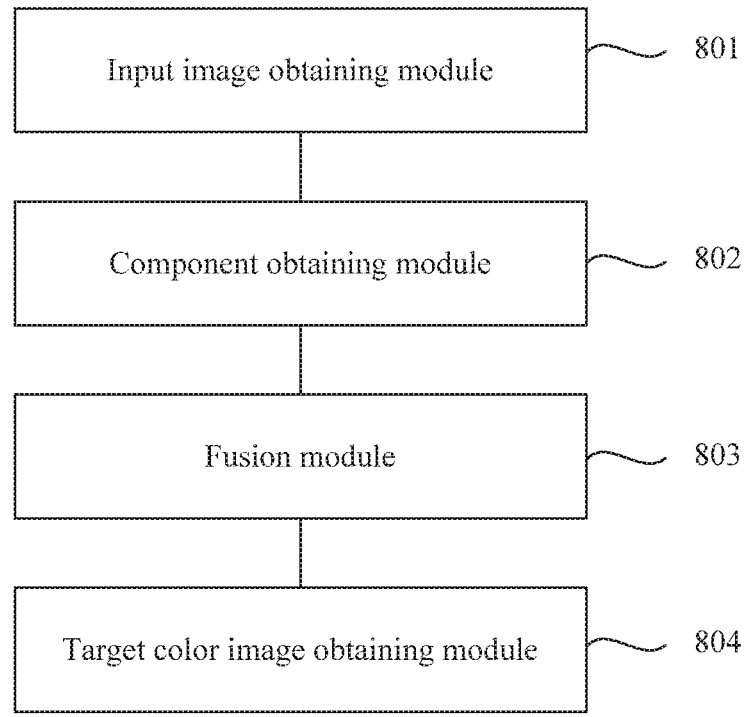
FIG. 8 is a schematic structural diagram of Embodiment 1 of an image processing apparatus of a terminal according to the present invention.

Another aspect of the embodiments of the present invention provides an image processing apparatus of a terminal, where the terminal includes a monochrome camera and a color camera, the monochrome camera and the color camera are disposed side by side, and the apparatus is configured to execute the image processing method according to any of the foregoing embodiments, and has same technical features and technical effects. FIG. 8 is a schematic structural diagram of Embodiment 1 of an image processing apparatus of a terminal according to the present invention. As shown in FIG. 8, the apparatus includes: an input image obtaining module 801, configured to: receive a photographing instruction, and control, according to the photographing instruction, the monochrome camera and the color camera to simultaneously photograph a current scene, to obtain a monochrome image and a color image of the current scene; a component obtaining module 802, configured to obtain a luminance component and a chrominance component of the color image; a fusion module 803, configured to fuse the luminance component with the monochrome image to obtain a luminance-fused component; and a target color image obtaining module 804, configured to obtain a target color image according to the luminance-fused component and the chrominance component.

According to the image processing apparatus of the terminal provided in this embodiment of the present invention, the component obtaining module splits the color image into the luminance component and the chrominance component, the fusion module fuses the monochrome image with the luminance component to obtain the luminance-fused component, and finally the target color image obtaining module obtains the target color image according to the chrominance component and luminance fusion. Advantages of a high resolution and low noise of the monochrome image are exploited to fuse the monochrome image with the color image, so that the target color image finally obtained after the fusion has the advantages of a high resolution and low noise. Compared with the color image photographed by the color camera, image quality is improved.

The following uses a specific embodiment to describe the image processing apparatus of the terminal of the present invention in detail.

Optionally, the fusion module is specifically configured to: divide the luminance component into at least two luminance blocks, and perform registration on the luminance component and the monochrome image to obtain a registration result, where the registration result includes a monochrome image block to be fused with each luminance block; and fuse, according to the registration result, the luminance component with the monochrome image to obtain the luminance-fused component.

Further, the fusion module is specifically configured to: determine, for the luminance component according to a distance between the monochrome camera and the color camera, a focal length of the monochrome camera, and a focal length of the color camera, a search area in which registration processing is performed and that is in the monochrome image; and perform registration on the luminance component and the monochrome image in the search area to obtain the registration result.

Figure 9:
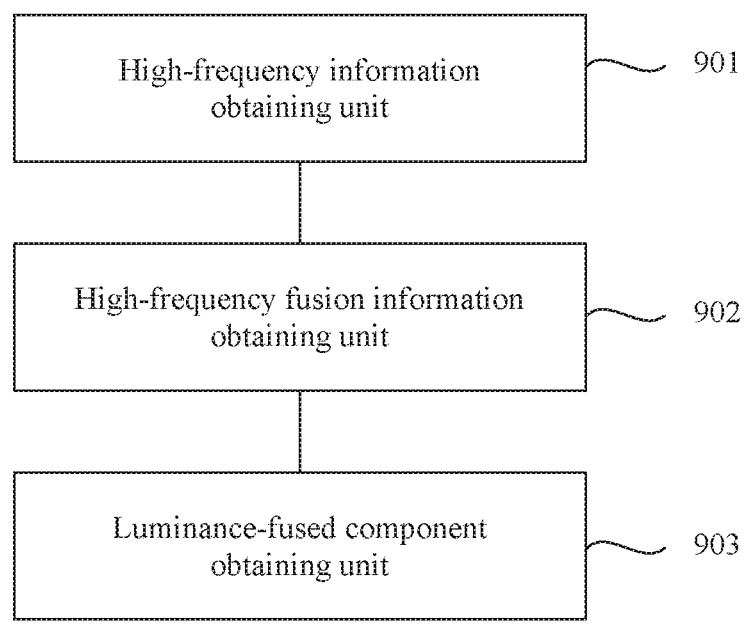
FIG. 9 is a schematic structural diagram of Embodiment 2 of an image processing apparatus of a terminal according to the present invention.

FIG. 9 is a schematic structural diagram of Embodiment 2 of the image processing apparatus of the terminal according to the present invention. As shown in FIG. 9, the fusion module 802 includes: a high-frequency information obtaining unit 901, configured to: obtain first high-frequency information and first low-frequency information of the luminance component, and obtain second high-frequency information of the monochrome image; a high-frequency fusion information obtaining unit 902, configured to fuse, according to the registration result, the first high-frequency information with the second high-frequency information to obtain high-frequency fusion information; and a luminance-fused component obtaining unit 903, configured to perform pixel addition processing on the first low-frequency information and the high-frequency fusion information to obtain the luminance-fused component.

Further, on the basis of the embodiment shown in FIG. 9, the fusion module 802 further includes: an enhancement unit, configured to perform enhancement processing on the high-frequency fusion information to obtain high-frequency fusion information obtained after the enhancement processing; and the luminance-fused component obtaining unit 903 is specifically configured to perform pixel addition processing on the first low-frequency information and the high-frequency fusion information obtained after the enhancement processing, to obtain the luminance-fused component.

Optionally, on the basis of any of the foregoing embodiments, the image processing apparatus of the terminal further includes: a luminance correction module, configured to perform luminance correction processing on the color image according to the monochrome image, to obtain a luminance-corrected color image; and the component obtaining module 802 is specifically configured to obtain a luminance component and a chrominance component of the luminance-corrected color image.

Optionally, on the basis of any of the foregoing embodiments, the image processing apparatus of the terminal further includes: a noise reduction module, configured to perform noise reduction processing on the chrominance component to obtain a chrominance component obtained after the noise reduction processing; and the target color image obtaining module 804 is specifically configured to obtain the target color image according to the luminance-fused component and the chrominance component obtained after the noise reduction processing.

Still another aspect of the embodiments of the present invention provides a terminal, including a monochrome camera and a color camera. The monochrome camera and the color camera are disposed side by side. The terminal is configured to execute the image processing method according to any of the foregoing embodiments, and has same technical features and technical effects.

An image processor of the terminal is configured to: receive a photographing instruction, and control, according to the photographing instruction, the monochrome camera and the color camera to simultaneously photograph a current scene, to obtain a monochrome image and a color image of the current scene; obtain a luminance component and a chrominance component of the color image; fuse the luminance component with the monochrome image to obtain a luminance-fused component; and obtain a target color image according to the luminance-fused component and the chrominance component.

Optionally, the image processor is specifically configured to: divide the luminance component into at least two luminance blocks, and perform registration on the luminance component and the monochrome image to obtain a registration result, where the registration result includes a monochrome image block to be fused with each luminance block; and fuse, according to the registration result, the luminance component with the monochrome image to obtain the luminance-fused component.

Further, the image processor is specifically configured to: determine, for the luminance component according to a distance between the monochrome camera and the color camera, a focal length of the monochrome camera, and a focal length of the color camera, a search area in which registration processing is performed and that is in the monochrome image; and perform registration on the luminance component and the monochrome image in the search area to obtain the registration result.

Optionally, the image processor is specifically configured to: obtain first high-frequency information and first low-frequency information of the luminance component, and obtain second high-frequency information of the monochrome image; fuse, according to the registration result, the first high-frequency information with the second high-frequency information to obtain high-frequency fusion information; and perform pixel addition processing on the first low-frequency information and the high-frequency fusion information to obtain the luminance-fused component.

Optionally, the image processor is further configured to: perform enhancement processing on the high-frequency fusion information to obtain high-frequency fusion information obtained after the enhancement processing; and perform pixel addition processing on the first low-frequency information and the high-frequency fusion information obtained after the enhancement processing, to obtain the luminance-fused component.

Optionally, the image processor is further configured to: perform luminance correction processing on the color image according to the monochrome image, to obtain a luminance-corrected color image; and obtain a luminance component and a chrominance component of the luminance-corrected color image.

Optionally, the image processor is further configured to: perform noise reduction processing on the chrominance component to obtain a chrominance component obtained after the noise reduction processing; and obtain the target color image according to the luminance-fused component and the chrominance component obtained after the noise reduction processing.

Yet another aspect of the embodiments of the present invention provides a storage medium, where the storage medium is a computer readable storage medium and stores one or more programs, the one or more programs include an instruction, and when being executed by a portable electronic device including a camera and multiple applications, the instruction enables the portable electronic device to execute the image processing method in any one of the foregoing method embodiments, where the camera includes a monochrome camera and a color camera.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An image processing method, comprising:
   receiving, by a terminal, a photographing instruction, wherein the terminal comprises a monochrome camera and a color camera, and wherein the monochrome camera and the color camera are disposed side by side;
   controlling, by the terminal, according to the photographing instruction, the monochrome camera and the color camera to simultaneously photograph a current scene, to obtain a monochrome image and a color image of the current scene;
   obtaining, by the terminal, a luminance component and a chrominance component of the color image;
   fusing, by the terminal, the luminance component with the monochrome image to obtain a luminance-fused component, the fusing comprising:
      obtaining, by the terminal, first high-frequency information and first low-frequency information of the luminance component:
      obtaining, by the terminal, second high-frequency information of the monochrome image;
      fusing the first high-frequency information with the second high-frequency information to obtain high-frequency fusion information; and
      performing pixel addition processing on the first low-frequency information and the high-frequency fusion information to obtain the luminance-fused component; and
   obtaining, by the terminal, a target color image according to the luminance-fused component and the chrominance component.

2. The method according to claim 1, wherein fusing the luminance component with the monochrome image comprises:
   obtaining, by the terminal, a registration result by:
      dividing the luminance component into a plurality of luminance blocks; and
      performing registration on the luminance component and the monochrome image, wherein the registration result comprises a monochrome image block to be fused with each luminance block; and
   fusing, by the terminal, according to the registration result, the luminance component with the monochrome image to obtain the luminance-fused component.

3. The method according to claim 2, wherein performing registration comprises:
   determining, by the terminal, a search area for the luminance component, according to a distance between the monochrome camera and the color camera, by determining a focal length of the monochrome camera, and a focal length of the color camera, wherein the search area in which registration processing is to be performed is in the monochrome image; and
   performing registration on the luminance component and the monochrome image in the search area to obtain the registration result.

4. The method according to claim 1, wherein, before performing pixel addition processing, the method further comprises performing, by the terminal, enhancement processing on the high-frequency fusion information to obtain high-frequency fusion information obtained after the enhancement processing; and
   wherein performing pixel addition processing comprises performing, by the terminal, pixel addition processing on the first low-frequency information and the high-frequency fusion information obtained after the enhancement processing, to obtain the luminance-fused component.

5. The method according to claim 1, wherein, before obtaining the luminance component and the chrominance component of the color image, the method further comprises performing, by the terminal, luminance correction processing on the color image according to the monochrome image, to obtain a luminance-corrected color image; and
   wherein obtaining the luminance component and the chrominance component of the color image comprises obtaining the luminance component and the chrominance component of the luminance-corrected color image.

6. The method according to claim 1, wherein, before obtaining the target color image, the method further comprises performing noise reduction processing on the chrominance component to obtain the chrominance component obtained after the noise reduction processing; and
   wherein obtaining the target color image according to the luminance-fused component and the chrominance component comprises obtaining the target color image according to the luminance-fused component and the chrominance component obtained after the noise reduction processing.

7. The method according to claim 1, wherein obtaining, by the terminal, the luminance component comprises converting the color image according to a color space conversion formula.

8. An apparatus, comprising:
   an image processor; and
   a non-transitory computer-readable storage medium storing a program to be executed by the image processor, the program including instructions to:
      receive a photographing instruction, and control, according to the photographing instruction, a monochrome camera and a color camera in a terminal, to simultaneously photograph a current scene, to obtain a monochrome image and a color image of the current scene, wherein the monochrome camera and the color camera are disposed side by side;
      obtain a luminance component and a chrominance component of the color image;
      fuse the luminance component with the monochrome image to obtain a luminance-fused component, the fusing comprising:
         obtaining first high-frequency information and first low-frequency information of the luminance component;
         obtaining second high-frequency information of the monochrome image;

fusing the first high-frequency information with the second high-frequency information to obtain high-frequency fusion information; and
performing pixel addition processing on the first low-frequency information and the high-frequency fusion information to obtain the luminance-fused component; and
obtain a target color image according to the luminance-fused component and the chrominance component.

9. The apparatus according to claim 8, wherein the instructions to fuse the luminance component with the monochrome image comprise instructions to:
obtain a registration result by dividing the luminance component into a plurality of luminance blocks, and performing registration on the luminance component and the monochrome image, wherein the registration result comprises a monochrome image block to be fused with each luminance block; and
fuse, according to the registration result, the luminance component with the monochrome image to obtain the luminance-fused component.

10. The apparatus according to claim 9, wherein the instructions to perform registration comprise instructions to:
determine a search area for the luminance component, according to a distance between the monochrome camera and the color camera, by determining a focal length of the monochrome camera, and a focal length of the color camera, wherein the search area in which registration processing is to be performed is in the monochrome image; and
perform registration on the luminance component and the monochrome image in the search area to obtain the registration result.

11. The terminal according to claim 8, wherein the program further comprises instructions to perform the following, before performing pixel addition processing: perform enhancement processing on the high-frequency fusion information to obtain high-frequency fusion information obtained after the enhancement processing; and
wherein the instructions to perform pixel addition processing comprise instructions to perform pixel addition processing on the first low-frequency information and the high-frequency fusion information obtained after the enhancement processing, to obtain the luminance-fused component.

12. The terminal according to claim 8, wherein the program further comprises instructions to perform the following, before obtaining the luminance component and the chrominance component of the color image: perform luminance correction processing on the color image according to the monochrome image, to obtain a luminance-corrected color image; and
wherein the instructions to obtain the luminance component and the chrominance component of the color image comprise instructions to obtain the luminance component and the chrominance component of the luminance-corrected color image.

13. The apparatus according to claim 8, wherein the program further comprises instructions to perform the following, before obtaining the target color image, perform noise reduction processing on the chrominance component to obtain a chrominance component obtained after the noise reduction processing; and
wherein the instructions to obtain the target color image comprise instructions to obtain the target color image according to the luminance-fused component and the chrominance component obtained after the noise reduction processing.

14. The apparatus according to claim 8, wherein the instructions to obtain the luminance component comprises instructions for converting the color image according to a color space conversion formula.

15. A terminal, comprising:
a monochrome camera;
a color camera, wherein the monochrome camera and the color camera are disposed side by side; and
an image processor coupled to the monochrome camera and the color camera;
wherein the image processor is configured to:
receive a photographing instruction; and
control, according to the photographing instruction, the monochrome camera and the color camera to simultaneously photograph a current scene, to obtain a monochrome image and a color image of the current scene; and
wherein the image processor is further configured to:
obtain a luminance component and a chrominance component of the color image;
fuse the luminance component with the monochrome image to obtain a luminance-fused component, the fusing comprising:
obtaining first high-frequency information and first low-frequency information of the luminance component;
obtaining second high-frequency information of the monochrome image;
fusing the first high-frequency information with the second high-frequency information to obtain high-frequency fusion information; and
performing pixel addition processing on the first low-frequency information and the high-frequency fusion information to obtain the luminance-fused component; and
obtain a target color image according to the luminance-fused component and the chrominance component.

16. The terminal according to claim 15, wherein the image processor is configured to fuse the luminance component with the monochrome image by being configured to:
obtain a registration result by dividing the luminance component into at least two luminance blocks, and performing registration on the luminance component and the monochrome image to obtain a registration result, wherein the registration result comprises a monochrome image block to be fused with each luminance block; and
fuse, according to the registration result, the luminance component with the monochrome image to obtain the luminance-fused component.

17. The terminal according to claim 16, wherein the image processor is configured to perform registration by being configured to:
determine, a search area for the luminance component, according to a distance between the monochrome camera and the color camera, by determining a focal length of the monochrome camera, and a focal length of the color camera, wherein the search area in which registration processing is to be performed is in the monochrome image; and
perform registration on the luminance component and the monochrome image in the search area to obtain the registration result.

18. The terminal according to claim 15, wherein the image processor is further configured to perform enhancement processing on the high-frequency fusion information to obtain high-frequency fusion information obtained after the enhancement processing; and
- wherein the image processor is configured to perform pixel addition processing by being configured to perform pixel addition processing on the first low-frequency information and the high-frequency fusion information obtained after performing enhancement processing, to obtain the luminance-fused component.

19. The terminal according to claim 15, wherein the image processor is further configured to perform luminance correction processing on the color image according to the monochrome image, to obtain a luminance-corrected color image; and
- wherein the image processor is configured to obtain the luminance component and the chrominance component of the color image, by being configured to obtain the luminance component and the chrominance component of the luminance-corrected color image.

20. The terminal according to claim 15, wherein the image processor is further configured to perform noise reduction processing on the chrominance component to obtain a chrominance component obtained after the noise reduction processing; and
- wherein the image processor is configured to obtain by the target color image by being configured to obtain the target color image according to the luminance-fused component and the chrominance component obtained after performing the noise reduction processing.

\* \* \* \* \*